UNITED STATES PATENT OFFICE.

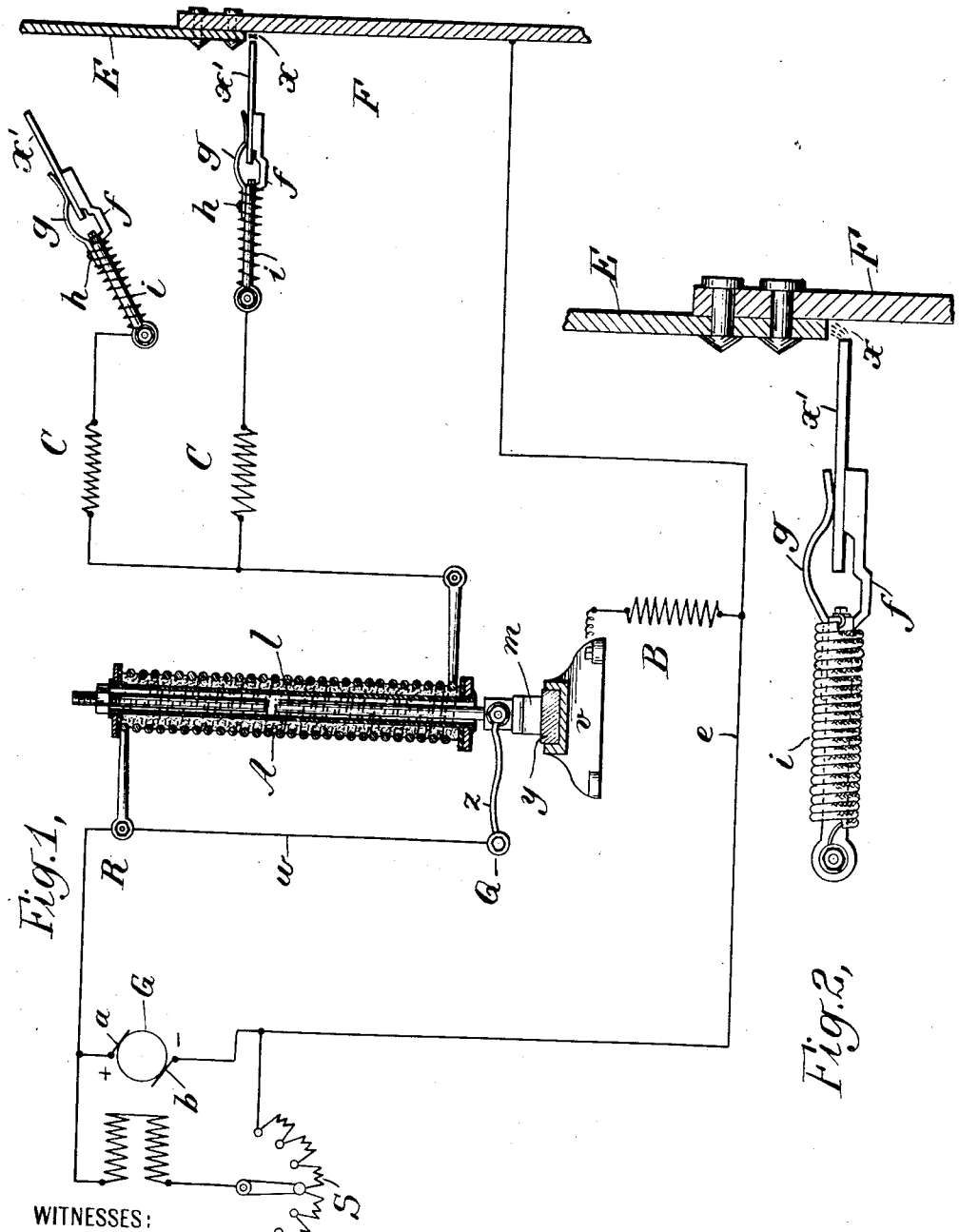

HEINRICH L. J. SIEMUND, OF NEW YORK, N. Y.

METHOD OF ELECTRIC WELDING AND REPAIRING.

967,579. Specification of Letters Patent. Patented Aug. 16, 1910.

Application filed January 19, 1910. Serial No. 538,812.

*To all whom it may concern:*

Be it known that I, HEINRICH L. J. SIEMUND, a subject of the Emperor of Germany, residing in the borough of Manhattan, city and county of New York and State of New York, have invented certain new and useful Improvements in Methods of Electric Welding and Repairing; and I do hereby declare the following to be a full, clear, and exact description of the invention, such as will enable others skilled in the art to which it appertains to make and use the same.

My invention relates to certain new and useful improvements in electric welding and repairing.

As will hereinafter appear, the invention is applicable generally to the art of electric welding and repairing but has characteristic and specific advantages in its application to the electric welding and repairing of parts which are difficult of access to the operator by reason of their location and which frequently cannot be welded *in situ* by ordinary welding operations even when the electric current is employed. A familiar instance of this kind is the marine boiler, usually installed in portions of the ship where space is economized, and of a weight and dimensions that do not permit it to be shifted to accommodate the convenience of the welding operator, without excessive labor and expense. The difficulty of electrically welding or repairing devices which, like steam boilers, are subjected to furnace heat, is likewise increased by the considerable contraction and expansion to which they are subjected. Indeed, so far as I am aware, it has not heretofore been found practicable to produce satisfactory and reliable welds in apparatus of this kind, while exposed to furnace heat and no absolutely reliable method has heretofore been proposed, within my knowledge, whereby such welding could be effected without over-heating the parts adjacent to the weld to a greater or less degree so as to produce a certain amount of deformation and tension in the structure as a whole, sometimes resulting in the production of cracks or fissures even in distant spots, as the parts subsequently cool. For instance, it has happened that, where a marine boiler was repaired by a gas welding process the welding heat incident to the operation caused such a deformation of the boiler in the parts adjacent to the weld that, on cooling, the tension due to contraction caused a fracture of the boiler shell at various and even relatively distant parts, which gave way simultaneously with a noise comparable to the report of a gun. The damage thus occasioned was readily and speedily repaired by the practice of the present invention, and the gas weld itself which was found to be ineffective was at the same time replaced by a reliable and durable electric weld.

The characteristic features of my invention which permit its successful practice, under conditions where the ordinary processes fail, will be apparent from the following description of the character of the preferred installation and the method or mode of operation involved in its use. Thus, in the practice of my invention I take precautions to raise the temperature of the portions to be welded to the same temperature as the material employed for filling in the weld (*i. e.* to the welding temperature) and to substantially restrict this high welding heat to the immediate location of the weld, instead of raising the neighboring portions of the work to that temperature. By this expedient, the welding metal and the metal to be welded, *i. e.* the new metal and the old metal, being at the same degree of temperature and in the same molten condition at their points of contact unite intimately with each other and form a homogeneous mass. Moreover, this new or welding metal which I supply to the seam, fracture or other place of weld is in accordance with the practice of my invention, applied gradually and in small increments, so that only small portions of the work are heated, leaving the remaining portions comparatively unaffected.

Another feature of primary importance for the practice of the invention in its preferred form consists in bringing the welding metal under the influence of a magnetic field, in such manner that as it melts it will follow the lines of magnetic force leading outwardly through the electric arc to the point of desired deposition, that is to the welding place. The advantages of this feature of the invention are that in whatever direction it is necessary to apply the welding metal, whether downward, upward or laterally, the welding metal will follow the arc and be deposited at exactly the point of attachment desired. A convenient and, in practice, a satisfactory expedient for this purpose is to employ the welding metal in the form of a solid or hollow soft iron wire and to insert it in a soft iron clamp or holder constituting the core of a magnetizing coil, such magnetizing coil being conveniently supplied with magnetizing current from the welding circuit itself.

Simple and effective means for practicing the invention are illustrated in the accompanying drawings, wherein, Figure 1 represents diagrammatically, one form or modification of a suitable installation for the purpose; Fig. 2 represents a separate view, on a larger scale, showing the welding clamp in its preferred form in its application to the welding of a seam.
Similar letters of reference indicate similar parts on both views.

Referring to the drawings, G indicates a direct current dynamo, provided with an adjustable rheostat S in series with the field, and which, together with the field, is in shunt to the armature. The rheostat is employed for the purpose of regulating the tension of the welding current as desired, it being usually found desirable to operate with a current of from 50 to 70 volts.

In the installation represented in Fig. 1, the plus brush a of the dynamo is connected through an automatic two-way switch, as shown in that figure, to a compensating or quieting resistance coil C and thence to the welding clamp which holds the solid or hollow welding wire x'. For purposes of illustration, the installation is shown as applied to the welding of a lapped and riveted boiler seam, made up of the over-lapping plates E, F, riveted together along the lapped joint. The current passes from the outer free end of the welding wire x', through an electric arc established from said end, to the seam to be welded and thence returns by the return conductor e to the negative brush b of the dynamo.

The cross-section of the welding wire is so chosen that, with the current employed, it will bring to the welding temperature and to incipient melting that portion of the work which is to receive the molten addition of new metal, so that the molten new metal as it is supplied from the free end of the wire coalesces intimately and homogeneously with the molten surface to which it is to be applied, thereby building up gradually, and in small increments as the work proceeds, an electric weld wherein the old and new metal are so intimately united that they become substantially integral.

When the surfaces to be united are of iron or steel as in boiler construction, it is sufficient to employ a solid iron or steel wire of the same quality substantially as that of the boiler plate, and this wire is conveniently made up of short lengths of say ten to twelve inches and of a diameter of say one-eighth to three-eighths of an inch, so that, with the current employed (usually of about 200 amperes and 50 to 70 volts), the resulting arc, while sufficient to bring the free end of the welding wire to a condition sufficiently molten that it will progressively detach itself from the main body portion of the wire, yet will be only sufficient to raise to a like melting point that portion of the surface of the work with which the molten welding wire is designed to coalesce, the heat being insufficient to materially affect the adjacent or more distant parts or to cause material deformation and resulting tensions in the welded structure as a whole. If the metal to be welded is of material having a different melting point than iron, it may, in some instances, be found preferable to increase the cooling surface of the welding metal in some suitable manner, for instance, by making the welding wire hollow as hereinbefore indicated, care being taken in every case that the welding wire during the process shall heat the place to be welded, through the intermediacy of the arc, to the same degree as it is itself heated, so as to obtain the homogeneous coalescing of the welding metal with the welded surfaces as desired for homogeneous welding.

The welding clamp may conveniently consist of the main body portion f and the spring metal blade g, both of soft iron or steel connected by a rivet h, or the like, which rivet may also conveniently constitute the point of attachment of a small coil i of insulated copper wire, said coil enveloping a suitable portion of the handle of the clamp and being connected at its opposite end to the said handle. This copper coil being at both ends in electrical connection with the metal of the welding clamp constitutes a branch circuit, through which passes a portion of the welding current corresponding to the drop in tension between the points of the clamp to which the ends of the coil are attached, and it consists of a sufficient number of ampere turns to magnetize the clamp and consequently the iron welding wire x' to a sufficient degree that as the molten metal at the end of the welding wire progressively detaches itself therefrom as the welding operation proceeds said molten metal will follow the lines of force and will deposit itself upon the place intended for its reception, whatever may be the relative position of the surfaces to be welded. Consequently, whether the seam or other place to be welded is below the operator, above, or to one side, the welding metal will invariably and with exactness follow the arc and attach itself to the place designed for its reception, even though the seam or the like should be vertically above the welding wire. This has the advantage that the operator can leave the work in whatever position it chances to be, and without moving or displacing the work can form a continuous and reliable weld wherever it is possible for him to reach the place of weld by projecting the welding wire into sufficient proximity thereto to establish and maintain the arc. In narrow and contracted spaces, therefore, where it is only possible for the operator to follow the seam or the like with the welding wire, it is feasible for him to work with rapidity and efficiency whatever position the seam or other place to be welded may have, whether below, above, or to either side as the work progresses,—a result which, in so far as I am aware, has never heretofore been obtained and which permits the effective electric welding *in situ* of marine boilers and like bulky and ponderous devices without requiring their displacement or the disconnection of any of their fittings.

In some instances, the welding operation may be directed toward filling out anew the worn holes of stay-bolts or the like and thereafter cutting a new thread in the filling metal. So also, by first replacing the welding wire with an iron rod of larger cross-section, so that the current employed shall not be sufficient to melt off its free end, the electric arc may be employed to entirely cut out and remove damaged portions of the boiler shell or other work and to then place thereon a patch to be subsequently electrically welded in place. In this manner it has been found readily feasible to cut out and remove with great rapidity a piece of one inch in thickness, it being merely necessary in such case to increase the tension of the dynamo to a degree corresponding to the thickness of the portion to be cut out, as, for instance, from 50 volts to say 100 to 110 volts.

Should it be desired to so practice the welding or repairing operation that the solid or hollow rod of welding metal shall be altered in character or quality as it melts off in the small increments desired, this end may be accomplished by coating the rod externally, if it is a solid rod, or by filling it, if it is hollow, with a suitable compound or material, so that, under the influence of the welding arc, the material selected for the coating or filling of the rod will, as the welding metal melts, effect the desired conversion, as, for instance, the production of a tenacious quality of weld where the metal if employed alone would tend to be more or less hard or brittle. This particular feature of the invention will constitute the subject-matter of a separate application for Letters Patent.

It is highly desirable and practically necessary for satisfactory work to provide the installation with means for always insuring a certain load for the dynamo when in operation, so that the speed of the dynamo and its actuating engine or motor may not suddenly rise when the operator breaks the welding circuit, for the insertion of a new welding wire or for some other reason, and so that when the operator suddenly reëstablishes the welding circuit the speed of the generator and its engine shall not be cut down so as to primarily give a decreased tension on the line. By this expedient the arc is quickly reëstablished after each interruption, without waiting for the current to "build up", and accordingly the welding proceeds without annoyance to the operator, his circuit being always in full operative condition when called upon regardless of the number of times the arc may be extinguished either by himself or by one of his fellow workmen on a branch circuit. Thus, in Fig. 1, the automatic two-way switch illustrated comprises a movable soft iron core $l$ enveloped by the magnetizing coil A, of a sufficient number of ampere turns to raise the core and break contact between its base $m$ and the carbon block $y$, when the welding circuit is completed by the establishment of the arc $x$. The base $m$ and the carbon block $y$ constitute contacts in a shunt circuit including the resistance B, a flexible wire $z$ and a lead $w$. With this arrangement, if the welding operation momentarily ceases, by the breaking of the welding arc (due to any cause) the coil A becomes de-energized and permits the iron core $l$ to fall. In falling, the base $m$ of the iron core makes contact with the carbon block $y$ and establishes a new path for the dynamo current, to wit, from the plus pole $a$ of the dynamo, by way of the binding post R, lead $w$, binding post Q and flexible wire $z$, through the contacts $m$, $y$, conducting base $v$ and resistance B to the minus brush of the dynamo. When the welding arc is reëstablished, this shunt connection is broken by reason of the energizing of the coil A, which thereupon raises the core $l$. The resistance B is so chosen as to furnish the desired load for the dynamo during the momentary interruptions of the welding circuit, and consequently the dynamo is under constant load during the entire progress of the work.

If the output of the dynamo is sufficient, the same dynamo may supply one or more additional welding circuits entirely separate from and duplicates of the circuit illustrated in said figure; or, as shown in Fig. 1, instead of a single welding clamp, one or more additional welding clamps may be employed, each arranged in a branch beyond the automatic two-way switch, each of these additional branches being likewise provided with a corresponding resistance C; all as indicated, for instance, in Fig. 1.

The apparatus herein described is claimed in my application for Letters Patent Serial No. 499,927, filed June 3, 1909.

What I claim is:

1. The method of electric welding or repairing, which consists in establishing an electric arc between the metallic object to be welded or repaired and the welding or repairing metal, the heat of the arc being such as to raise the temperature of those portions of the object to be welded or repaired and also the temperature of the welding or repairing metal to incipient fusion and also that the new metal as it melts will become detached and unite in small increments with the parts to be welded or repaired, the intense heating of the object to be welded or repaired being restricted to the place of application of the new metal, thereby avoiding objectionable deformation and tension strains; substantially as described.

2. The method of electric welding or repairing, which consists in establishing an electric welding arc between the metallic object to be welded or repaired, and the end of a rod of the welding or repairing metal, the heat of the arc being sufficient to raise the parts to be welded or repaired to incipient fusion and to cause the end portions of the rod to melt and unite with substantial homogeneity to the fused portions of the piece being welded or repaired; substantially as described.

3. The method of electric welding or repairing, which consists in establishing an electric welding arc between the parts to be welded or repaired and the new metal constituting the welding or repair metal, and bringing the new metal under the influence of a magnetic field in the manner described so that as it melts it will be carried toward the parts to be welded or repaired, whatever position the latter may occupy; substantially as described.

4. The method of electric welding or repairing, which consists in establishing an electric welding arc between the parts to be welded or repaired and the end of a rod constituting the welding or repairing metal, and bringing said rod under the influence of a magnetic field in the manner described so that as its end portion melts in small instalments, the melted metal will be carried to the place of weld or repair; substantially as described.

5. In the art of electric welding or repairing, so correlating the current employed for the production of the arc, to the welding or repairing metal and the metallic objects to be welded or repaired as to melt off in small increments the end portions of the welding or repairing metal and to likewise fuse the immediate parts to be welded or repaired but without causing objectionable deformation or tension strains in neighboring or distant parts of the piece to be welded or repaired; substantially as described.

In testimony whereof I affix my signature, in presence of two witnesses.

HEINRICH L. J. SIEMUND.

Witnesses:
JOHN C. PENNIE,
WILLIAM H. DAVIS.

---

It is hereby certified that in Letters Patent No. 967,579, granted August 16, 1910, upon the application of Heinrich L. J. Siemund, of New York, N. Y., for an improvement in "Methods of Electric Welding and Repairing," an error appears in the printed specification requiring correction as follows: Page 4, line 57, after the word "electric" the word *arc* should be inserted; and that the said Letters Patent should be read with this correction therein that the same may conform to the record of the case in the Patent Office.

Signed and sealed this 20th day of September, A. D., 1910.

[SEAL.]

C. C. BILLINGS,
*Acting Commissioner of Patents.*